(12) United States Patent
Yamane (10) Patent No.: US 8,443,855 B2
(45) Date of Patent: May 21, 2013

(54) PNEUMATIC TIRE (75) Inventor: Kenji Yamane, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 931 days.

(21) Appl. No.: 12/235,284

(22) Filed: Sep. 22, 2008

(65) Prior Publication Data

US 2009/0114323 A1 May 7, 2009

(30) Foreign Application Priority Data

Nov. 7, 2007 (JP) ................................. 2007-289438

(51) Int. Cl.
*B60C 11/00* (2006.01)

(52) U.S. Cl.
USPC .............. 152/209.28; 152/209.1; 152/209.14; D12/502; D12/520; D12/535; D12/548; D12/552; D12/564

(58) Field of Classification Search
USPC ............ 152/209.1, 209.14, 209.28; D12/502, D12/520, 535, 548, 552, 564
See application file for complete search history.

(56) References Cited

U.S. PATENT DOCUMENTS

| 6,065,517 A | * | 5/2000 | Maruyama | ............... | 152/209.28 |
| 6,450,223 B1 | * | 9/2002 | Landers et al. | ............ | 152/209.5 |
| 2002/0139460 A1 | * | 10/2002 | Boiocchi et al. | ........... | 152/209.2 |
| 2006/0162831 A1 | * | 7/2006 | Ishida | ...................... | 152/209.18 |

FOREIGN PATENT DOCUMENTS

JP       A 2004-168142       6/2004

* cited by examiner

*Primary Examiner* — Jacob Thomas Minskey
(74) *Attorney, Agent, or Firm* — Greer, Burns & Crain, Ltd.

(57) ABSTRACT

Disclosed is a pneumatic tire including a straight main groove and two wave-shaped main grooves arranged in the center area of a tread, and diagonal grooves arranged in each shoulder area ranging from each wave-shaped main groove to the outer side of the tire, and extending obliquely outward from the wave-shaped main groove to a direction reverse to the tire rotational direction, the rotational direction being specified for the tire. Each diagonal groove is formed to have a convex protruding toward the outer side of the tire, and the extending end portion of the diagonal groove terminates in the shoulder area. Thus, each shoulder area is provided with a non-block pattern in which a land section continues in the tire circumferential direction. Thereby, the pneumatic tire has increased driving stability and uneven wear resistance while substantially maintaining good drainage performance and noise performance against columnar resonance.

9 Claims, 3 Drawing Sheets

Fig. 4

PNEUMATIC TIRE

BACKGROUND OF THE INVENTION

1. Field of the Invention

The present invention relates to a pneumatic tire, and specifically to a pneumatic tire which has improved driving stability and uneven wear resistance while maintaining good drainage performance based on main grooves each having a wide groove width and extending in a tire circumferential direction.

2. Description of the Related Art

General measures for improving the drainage performance of a pneumatic tire include a technique of arranging straight main grooves each having a wide groove width respectively in the center area and the two shoulder areas of the tread in the tire circumferential direction. A pneumatic tire with such straight main grooves has improved drainage performance, but suffers from the following problems. First, the straight main grooves cause a large columnar resonance while the tire is being run, and accordingly worsens noise performance. Second, since the straight main grooves each having the wide groove width are arranged even in the respective shoulder areas, the rigidity of each shoulder area decreases, and the driving stability accordingly decreases.

Figure 4:
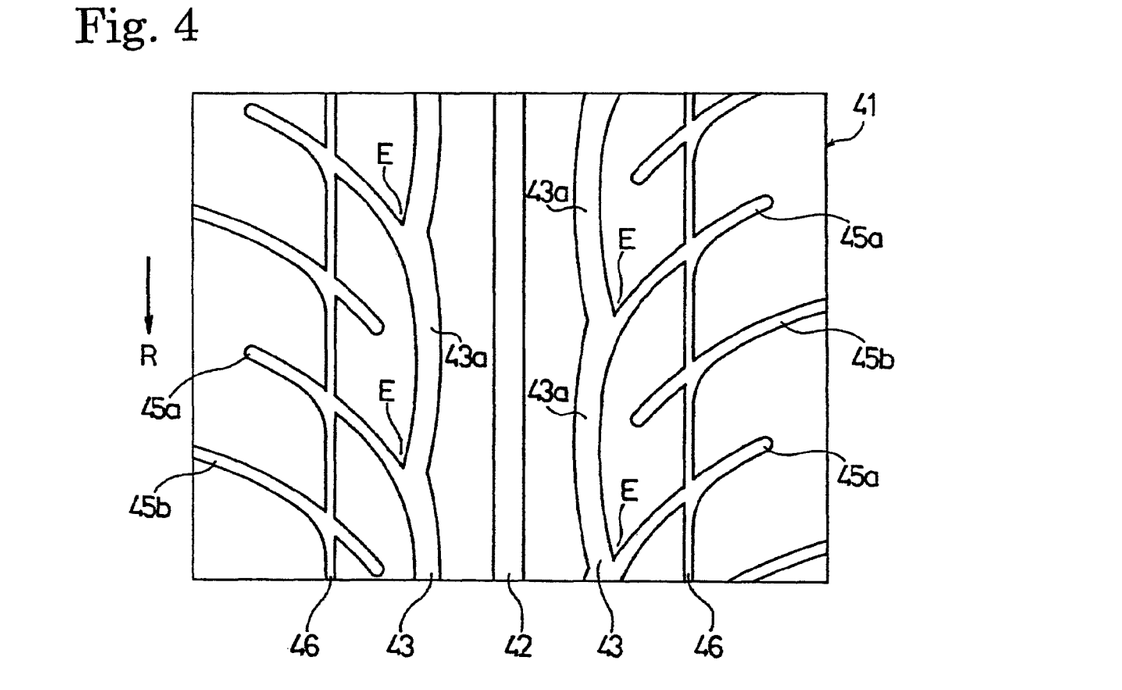
FIG. 4 is a plan view of a chief section of a tread of an existing pneumatic tire.

For the purpose of solving these problems, Japanese patent application Kokai publication No. 2004-168142 proposes a pneumatic tire which has a tread pattern as shown in FIG. 4, and for which a rotational direction R is specified. In this tread pattern, three main grooves 42, 43, 43 each having a wide groove width are arranged in the center area of a tread 41. Among the three main grooves, the main groove 42 located on the tire equator CL is a straight main groove, and the other two main grooves 43 located at two sides of the straight main groove 42, respectively, are each a wave-shaped main groove whose groove wall curves in the form of a wave. Since the three main grooves 42, 43, 43 each having the wide groove width are arranged in the center area of the tread 41 in the above-described manner, the drainage performance is improved. In addition, since each of the right and left main grooves 43 is formed by connecting multiple arc-shaped grooves 43*a* in series, the two sidewalls of the main groove 43 each curve in the form of a wave in the tire circumferential direction, thereby preventing the columnar resonance.

In each shoulder area, diagonal grooves 45*a* each having a narrow groove width and the other diagonal grooves 45*b* are arranged alternately in the tire circumferential direction. The diagonal grooves 45*a* extend obliquely outward from the respective connecting portions each between two neighboring arc-shaped grooves 43*a* of each main groove 43 in a direction reverse to a tire rotational direction. The diagonal grooves 45*b* each extend in parallel with the diagonal grooves 45*a* from an intermediate portion of each of the shoulder areas to the corresponding shoulder end. In addition, narrow grooves 46 each having a narrow groove width intersect with the diagonal grooves 45*a* and 45*b* in the tire circumferential direction. As a result, each shoulder area has a block pattern in which multiple blocks are arranged. In this way, instead of arranging the main grooves 42, 43, 43 each having the wide groove width, the diagonal grooves 45*a* and 45*b* and the narrow groove 46 each having the narrower groove width than those of the main grooves 42, 43, 43 are arranged in each shoulder area. This arrangement secures the rigidity of the shoulder area, thereby improving the driving stability in cornering driving.

However, the above-described pneumatic tire has a limit to further improve the driving stability, since the pneumatic tire is provided with the block pattern in which the multiple blocks are arranged in each shoulder area. In addition, since the diagonal groove 45*a* constituting the block pattern curves so as to have a convex shape protruding toward the inner side of the tire, leading-edge corner portions E each formed between each of the diagonal grooves 45*a* and the main groove 43 has a sharp acute angle. This presents problems of decreasing the rigidity of the corner portion E locally, and thereby easily causing uneven wear of the tire.

Furthermore, the diagonal grooves 45*a* and 45*b* located in the shoulder areas each curve so as to have a convex shape protruding toward the inner side of the tire. This makes the leading edge of each of the diagonal grooves 45*a* and 45*b* coincides with the front edge of the tread contact patch at a higher rate. This presents another problem that the front edge of each block makes a large hitting sound when the front edge thereof lands on the road surface, that is, pattern noise is large.

SUMMARY OF THE INVENTION

An object of the present invention is to provide a pneumatic tire which has improved driving stability and uneven wear resistance while substantially maintaining good drainage performance based on the above-described main grooves and noise performance against the columnar resonance. Another object of the present invention is to provide a pneumatic tire which has improved noise performance against the pattern noise.

A pneumatic tire according to the present invention for the purpose of achieving the foregoing objects is a pneumatic tire for which a tire rotational direction is specified, including: a straight main groove arranged in a center area of a tread in a tire circumferential direction; a wave-shaped main groove arranged in the tire circumferential direction at each of two sides of the straight main groove with a rib-shaped land section interposed between the straight main groove and the wave-shaped main groove, the wave-shaped main groove being formed by connecting a plurality of arc-shaped grooves in series in the tire circumferential direction, and each arc-shaped groove curving to have a convex shape protruding toward the inner side of the tire; and a plurality of diagonal grooves arranged in each shoulder area ranging from its corresponding one of the wave-shaped main grooves toward the outer side of the tire, each diagonal groove extending obliquely outward from a connecting part between corresponding two arc-shaped grooves to a direction reverse to the tire rotational direction. Each diagonal groove is formed to have a convex arc shape protruding toward the outer side of the tire. An extending end portion of each diagonal groove terminates in the shoulder area. Each shoulder area is provided with a non-block pattern in which the land section continues in the tire circumferential direction.

The pneumatic tire according to the present invention can be further configured as follows.

Each wave-shaped main groove is formed to be a see-through groove by which when the wave-shaped main groove is viewed in the tire circumferential direction, a farther side can be viewed while the view is not obstructed by the right and left groove walls of the wave-shaped main groove, and a distance (L1) with which each outermost edge of the wave-shaped main groove is away from a tire equator (CL) in tire width directions is set at 10% to 20% of a tread arc width (TW). In addition, an amplitude (W) of each wave-shaped main groove is set at a range of 1% to 5% of the tread arc width (TW), and the pitch length (P) with which the arc-shaped grooves are repeated is set at 50 mm to 90 mm.

A groove width of each diagonal groove is smaller than a groove width of the straight main groove and a groove width of each wave-shaped main groove. In addition, an average oblique angle ($\alpha$) of each diagonal groove to the tire circumferential direction is set at 40° to 70° in its groove part ranging from its corresponding one of the wave-shaped main grooves to a location corresponding to a half of the length of the diagonal groove in the tire width directions, and an average oblique angle ($\beta$) of each diagonal groove to the tire circumferential direction is set at 10° to 40° in its remaining groove part ranging from the location corresponding to the half of the length to an outermost end of the diagonal groove.

A distance (L2) with which the outermost end of each diagonal groove is away from the tire equator (CL) in the tire width direction is set at 27% to 38% of the tread arc width (TW), and a length (L3) of each diagonal groove in the tire circumferential direction is set at 75% to 95% of the pitch length (P) with which the arc-shaped grooves are repeated.

In each shoulder area, arc-shaped auxiliary diagonal grooves may be arranged. The starting end of each auxiliary diagonal groove is located in an area between the corresponding two of the diagonal grooves adjacent to each other in the tire circumferential direction, and the auxiliary diagonal groove extends obliquely outward to an end portion of the shoulder area in the direction reverse to the tire rotational direction. In addition, each auxiliary diagonal groove curves to have a convex arc shape protruding in a direction opposite to the direction in which the corresponding diagonal grooves protrude. Thereby, the shoulder area is provided with a non-block pattern in which the land section continues in a zigzag fashion in the tire width and circumferential directions. It is desirable that the groove width of a groove part of each thus-arranged auxiliary diagonal groove which extends toward the inner side of the tire from a position corresponding to a location of the extending end portion of the corresponding diagonal groove thus extended be set gradually smaller toward the inner side of the tire.

In an innermost part of each auxiliary diagonal groove in the tire width direction, an angle which a groove wall located at the outer side of the tire makes with the normal line that is perpendicular to a tread surface may be set larger than an angle which a groove wall located at the inner side of the tire makes with the normal line. In the intermediary part of the auxiliary diagonal groove in the tire width directions, an angle which a groove wall located at the outer side of the tire makes with the normal line may be set equal to an angle which a groove wall located at the inner side of the tire makes with the normal line. In an outermost part of each auxiliary diagonal groove in the tire width direction, an angle which a groove wall located rearward in the tire rotational direction makes with the normal line may be set larger than an angle which a groove wall located forward in the tire rotational direction makes with the normal line.

It is desirable that the groove width of the straight main groove and the groove width of each wave-shaped main groove be each set to 5 mm to 15 mm, and that the groove width of each diagonal groove and the groove width of each auxiliary diagonal groove be set to be smaller than the groove width of the straight main groove and the groove width of the wave-shaped main groove, and be each set to 1 mm to 7 mm.

The pneumatic tire according to the present invention includes the straight main groove and the two wave-shaped main grooves. The straight main groove is arranged in the center area of its tread and extends in the tire circumferential direction. The wave-shaped main grooves extend in the tire circumferential direction respectively at the two sides of the straight main groove, and the groove wall of each wave-shaped main groove curves in the form of a wave. Accordingly, like the existing type of pneumatic tire, the pneumatic tire according to the present invention has both good drainage performance and good noise performance against columnar resonance. Further, the pneumatic tire according to the present invention has improved driving stability, since in each shoulder area, the diagonal grooves extending obliquely outward from the wave-shaped main groove in the direction reverse to the tire rotational direction are each formed so as to have a convex arc shape protruding toward the outer side of the tire, and the extending end portion of each of the diagonal grooves terminates in the shoulder area, thus forming the pattern in each shoulder area as the non-block pattern in which the land section continues in the tire circumferential direction, and thereby increasing the rigidity in each shoulder area.

Furthermore, since each diagonal groove is formed so as to have a convex arc shape protruding toward the outer side of the tire, the leading-edge corner portion formed between this diagonal groove and its corresponding arc-shaped groove of the wave-shaped main groove, the arc-shaped groove being formed so as to have a convex shape protruding toward the inner side of the tire and formed in a swollen shape in which the two sidewalls swell in their respective directions opposite to each other. For this reason, the pneumatic tire according to the present invention can have an increased rigidity of the leading-edge corner portion, and accordingly have increased uneven wear resistance in the leading-edge corner portion.

Moreover, since each diagonal groove in each shoulder area is formed so as to have a convex arc shape protruding toward the outer side of the tire, the oblique angle of this diagonal groove to the tire circumferential direction becomes gradually smaller toward the outer side of the tire in the tire width directions. Accordingly, an intersection angle of this diagonal groove to the front edge of the tread contact patch becomes larger. This shortens the length with which the leading-edge side end portion of each diagonal groove overlaps a front edge of the tread contact patch. This decreases an impact force which occurs if the leading-edge side end portion of each diagonal groove hit by the road surface when the tread contacts the road surface. For this reason, the pneumatic tire is capable of reducing the pattern noise.

DESCRIPTION OF THE PREFERRED EMBODIMENTS

Referring to the embodiments shown in the drawings, detailed descriptions of the present invention will be provided below.

Figure 1:
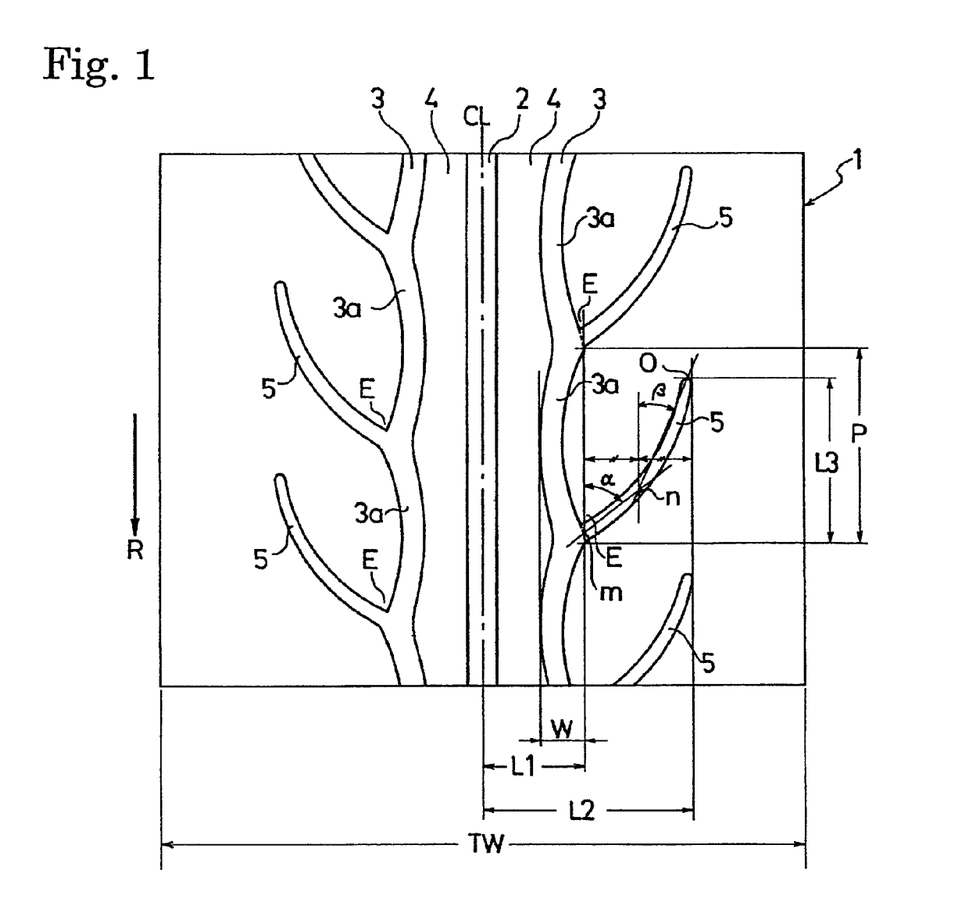
FIG. 1 is a plan view showing a chief section of a tread of a pneumatic tire according to an embodiment of the present invention.

FIG. 1 shows a chief section of a tread of a pneumatic tire according to an embodiment of the present invention.

The tire rotational direction of the pneumatic tire is specified as shown by an arrow R. A straight main groove 2 and two wave-shaped main grooves 3 are arranged in the center area of a tread 1. The straight main groove 2 has a wide groove width, and extends along the tire equator CL in a tire circumferential direction. The two wave-shaped main grooves 3 each have a wide groove width, and extend respectively at the right and left sides of the straight main groove 2 with land sections 4 interposed therebetween, the land sections 4 each extending continuously in the form of a rib. Each of the right and left wave-shaped main grooves 3 is formed by connecting multiple arc-shaped grooves 3a continuously in the tire circumferential direction in such a way that an end of each arc-shaped groove 3a is connected to an end of its neighboring arc-shaped groove 3a. Each arc-shaped groove 3a curves so as to have a convex shape protruding toward the inner side of the tire. The phases of the arrangement of the respective arc-shaped grooves 3a constituting one of the wave-shaped main grooves 3 are set off from the phases of the arrangement of the arc-shaped grooves 3a constituting the other thereof in the tire circumferential direction.

In each shoulder area located at the outer side of the tire from its corresponding wave-shaped main groove 3, diagonal grooves 5 are provided so as to extend obliquely outward in a direction reverse to the tire rotational direction from each connecting portion where two of the neighboring arc-shaped grooves 3a are connected together in the longitudinal direction. Each diagonal groove 5 is formed so as to have a convex arc shape protruding toward the outer side of the tire, and the extending end portion of the diagonal groove 5 terminates in the shoulder area. Since the extending end portion of each diagonal groove 5 terminates in the shoulder area in this manner, a pattern formed in the shoulder area is a non-block pattern in which the land section 4 extends continuously in the form of a rib in the tire circumferential direction.

Figure 2:
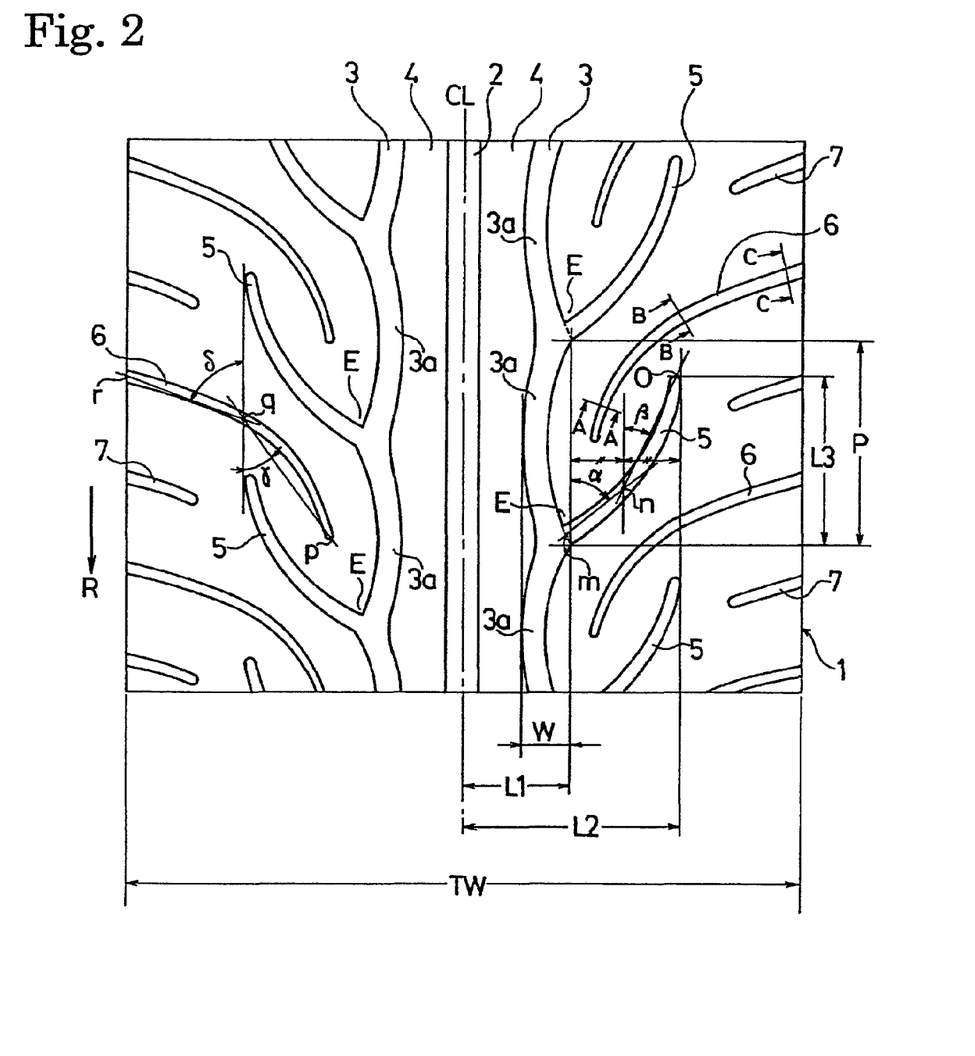
FIG. 2 is a plan view showing a chief section of a tread of a pneumatic tire according to the other embodiment of the present invention.

FIG. 2 shows a chief section of a tread of a pneumatic tire according the other embodiment of the present invention.

As in the embodiment in FIG. 1, in a tread 1 according to the present embodiment, the tire rotational direction is specified as shown by an arrow R. In the center area of the tread 1 of the present embodiment, as in the embodiment in FIG. 1, a straight main groove 2 having a wide groove width is arranged on the tire equator CL, and two wave-shaped main grooves 3 each having a wide groove width are respectively arranged at the two sides of the straight main groove 2 with rib-shaped land sections 4 interposed therebetween. Furthermore, in each shoulder area located at the outer side of the tire from its corresponding wave-shaped main groove 3, diagonal grooves 5 are provided so as to extend obliquely outward in a direction reverse to the tire rotational direction from each connecting portion where two of nearer ends of the neighboring arc-shaped grooves 3a of the wave-shaped main groove 3 are connected together.

Each shoulder area is further provided with auxiliary diagonal grooves 6 and 7 in addition to the foregoing diagonal grooves 5. The auxiliary diagonal grooves 6 are each formed so as to have a convex arc shape protruding toward the inner side of the tire, and curve in a direction opposite to those of the diagonal grooves 5. The auxiliary diagonal grooves 6 and the diagonal grooves 5 are alternately arranged in the tire circumferential direction. Each auxiliary diagonal groove 6 has the inner end in a region between its two neighboring diagonal grooves 5, and extends outward in the direction reverse to the tire rotational direction from this inner end to reach the end portion of the shoulder.

In addition, the other auxiliary diagonal grooves 7 are alternately arranged with the auxiliary diagonal grooves 6 in the tire circumferential direction, and are provided so as to extend from the shoulder end toward the inner side of the tire, and to terminate in the shoulder area. By arranging the auxiliary diagonal grooves 6 and 7 in each shoulder area in this manner, the pattern of each shoulder area is a non-block pattern in which the land section continues in a zigzag fashion in the tire width and circumferential directions.

Both in the cases of the pneumatic tires of the present invention shown in FIG. 1 and FIG. 2, the three main grooves each having wide groove width are provided in the center area of the tread 1. Only one among the three main grooves is the straight main groove 2, and the remaining two are each the wave-shaped main groove 3 whose groove wall curves in the form of a wave. Thereby, the pneumatic tire has good drainage performance and noise performance which prevents a columnar resonance. In addition, since each shoulder area located at the outer side of the tire from its corresponding wave-shaped main groove 3 is provided with the non-block pattern in which the land section continues in the tire circumferential direction, the pneumatic tire has a larger rigidity in the shoulder area and improved driving stability than the existing pneumatic tire each having a block pattern in which the shoulder is divided into multiple blocks.

Moreover, in the pneumatic tire of the present invention, each diagonal groove 5 is formed so as to have a convex arc shape protruding toward the outer side of the tire. Thereby, the leading-edge corner portion E formed between each diagonal groove 5 and its corresponding arc-shaped groove 3a of the wave-shaped main groove 3, which curves so as to have a convex shape protruding toward the inner side of the tire, is formed in a swollen shape with an increased area in which the two sidewalls swell in the outward directions. Thus, the pneumatic tire has an increased rigidity in the leading-edge corner portion E, thereby increasing uneven wear resistance therein.

As described above, each diagonal groove 5 is formed so as to have a convex arc shape protruding toward the outer side of the tire. Thereby, as the diagonal groove 5 extends outward in the tire width directions, the direction in which the diagonal groove 5 extends becomes closer to the tire circumferential direction, and accordingly the oblique angle of the diagonal groove 5 to the tire circumferential direction becomes gradually smaller. Thus, an intersection angle of the diagonal groove 5 to the front edge of the tire contact patch becomes larger. This shortens the length where the leading-edge portion of the diagonal groove 5 overlaps a front edge of the tire contact patch. This decreases an impact force which occurs when the leading-edge portion of the diagonal groove 5 contacts the road surface, i.e., reduces the pattern noise during the impact.

Moreover, as described above, the oblique angle of each diagonal groove 5, which is formed so as to have a convex arc shape protruding toward the outer side of the tire, to the tire circumferential direction becomes gradually smaller as the diagonal groove 5 extends outward in the tire width directions. This reduces the energy needed for the diagonal groove 5 to move water on a wet road surface in the tire width directions, and thus contributes to improving the drainage performance.

The pneumatic tire of the embodiment in FIG. 2 includes the auxiliary diagonal grooves 6 and 7 in addition to the grooves in the pneumatic tire of the embodiment in FIG. 1. Thereby, the drainage performance of the embodiment in FIG. 2 is better than that of the embodiment in FIG. 1. On the other hand, the rigidity of each shoulder area of the embodiment in FIG. 2 is slightly lower than that of the embodiment in FIG. 1, thus reducing the driving stability of the embodiment in FIG. 2 as compared to that of the embodiment in FIG.

1. However, since each shoulder area of the embodiment in FIG. 2 is provided with the non-block pattern in which the land section continues in a zigzag fashion in the tire width and circumferential directions, the driving stability of the pneumatic tire of the embodiment in FIG. 2 is not as low as that of the existing pneumatic tire having the shoulder areas each provided with the block pattern. In particular, the shape of each auxiliary diagonal groove 6 is rounded outward in a direction opposite to that of each diagonal groove 5. Thus, when the inner end portion of each auxiliary diagonal groove 6 is arranged between two neighboring diagonal grooves 5, each two regions between the two neighboring diagonal grooves 5 divided by the auxiliary diagonal groove 6 can be almost equal to each other in width. Thereby, the rigidity throughout the land section can be prevented from being reduced.

Additionally, in the embodiment in FIG. 2, a groove part of each auxiliary diagonal groove 6 from its position corresponding to the location of the extending end of each diagonal groove 5 toward the inner side of the tire becomes gradually narrower in its groove width toward the inner side of the tire. Thereby, in each region between two neighboring diagonal grooves 5, the volume of a part of the land section corresponding to the region is larger by the area reduced by narrowing down the groove width of the corresponding auxiliary diagonal groove 6.

In the present invention, it is desirable to form each wave-shaped main groove 3 to be a see-through groove. Forming each wave-shaped main groove 3 to be a see-through groove improves the drainage performance. What is meant by the "see-through" groove is that, when the wave-shaped main groove 3 is viewed in the tire circumferential direction, a farther side can be viewed while the view is not obstructed by the right and left groove walls of the wave-shaped main groove 3.

In addition, it is desirable that the distance (L1) from the tire equator (CL) to the outmost edge of each wave-shaped main groove 3 in the tire width directions be set at 10% to 20% of the tread arc width (TW). When the distance (L1) is shorter than 10% of the tread arc width (TW), the rib-shaped land section 4 between the straight main groove 2 and each wave-shaped main groove 3 is too narrow. This decreases braking performance and wear resistance. Meanwhile, when the distance is longer than 20% of the tread arc width (TW), the rib-shaped land section 4 is too wide. This decreases drainage performance.

It is desirable to set the amplitude (W) of each wave-shaped main groove 3 in the tire width directions at 1% to 5% of the tread arc width (TW), and concurrently to set the pitch length (P) with which the arc-shaped grooves 3a constituting the wave-shaped main groove 3 are repeated at 50 mm to 90 mm. When the amplitude (W) of each wave-shaped main groove 3 is less than 1% of the tread arc width (TW), or when the pitch length (P) is longer than 90 mm, the effect of preventing columnar resonance decreases. Meanwhile, when the amplitude (W) of each wave-shaped main groove 3 is more than 5% of the tread arc width (TW), or when the pitch length (P) is shorter than 50 mm, drainage performance decreases.

It is desirable that the groove width of each diagonal groove 5 be smaller than those of the straight main groove 2 and each wave-shaped main groove 3. By setting the groove width of each diagonal groove 5 smaller than those of the straight main groove 2 and each wave-shaped main groove 3, a larger area for the land section can be secured in each shoulder area, and this contributes to increasing driving stability. It is desirable to set the groove width of the straight main groove 2 and each wave-shaped main groove 3 at 5 mm to 15 mm. Concurrently, it is desirable to set the groove width of each diagonal groove 5 smaller than these grooves widths, and to set the groove width of each diagonal groove 5 at 1 mm to 7 mm.

In the present invention, each diagonal groove 5 is formed so as to have a convex arc shape protruding toward the outer side of the tire. This shape makes the oblique angle of each diagonal groove 5 to the tire circumferential direction larger in its groove part located at the inner side of the tire in the tire width directions, and makes the oblique angle thereof smaller in its remaining groove part located at the outer side of the tire in the tire width directions. With regard to the oblique angle of each diagonal groove 5 thus changing, it is desirable to set an average oblique angle ($\alpha$) at 40° to 70°, and is more desirable to set the average oblique angle ($\alpha$) at 30° to 60°, in its groove part located in a region ranging from the wave-shaped main groove 3 to a location corresponding to a half of the length of the diagonal groove 5 in the tire width directions. In addition, it is desirable to set an average oblique angle ($\beta$) at 10° to 40°, and is more desirable to set the average oblique angle ($\beta$) at 20° to 30°, in its remaining groove part located in a region ranging from the location corresponding to the half of the length of the diagonal groove 5 in the tire width directions to the extending end portion of the diagonal groove 5.

As described above, each diagonal groove 5 is formed in a way that the average oblique angle is larger in its groove part located at the inner side of the tire, and that the average oblique angle becomes smaller toward its groove part located at the outer side of the tire. This formation enables decreasing the pattern noise in each shoulder areas. Furthermore, this formation enables each diagonal groove 5 in each shoulder area to efficiently drain water which is taken in the diagonal groove 5 while the pneumatic tire is being run on a wet road surface. In other words, since the oblique angle of each diagonal groove 5 to the tire circumferential direction becomes smaller toward the region located at the outer side of the tire, the diagonal groove 5 decreases the energy needed to move water in the tire width directions, and accordingly facilitates smooth movement of water. This improves drainage performance.

Here, the average oblique angles are defined as follows. As shown in FIGS. 1 and 2, the average oblique angle ($\alpha$) is an oblique angle $\alpha$ which the below-defined straight line makes with the tire circumferential direction. The straight line is defined as a line joining a groove width center m which is situated at a meeting point between the diagonal groove 5 and the wave-shaped main groove 3 as well as a groove width center n which is situated at a point corresponding to the half of the length of the diagonal groove 5 in the tire width directions. In addition, the average oblique angle ($\beta$) is an oblique angle $\beta$ which the below-defined straight line makes with the tire circumferential direction. The straight line is defined as a line joining the groove width center n and a groove width center o which is situated at the extending end of the diagonal groove 5.

Further, for the diagonal groove 5 provided in the present invention, it is desirable to set the distance (L2) from the tire equator (CL) to the extending end portion of the diagonal groove 5 in the tire width directions at 27% to 38% of the tread arc width (TW), and to set the length (L3) of the diagonal groove 5 in the tire circumferential direction at 75% to 95% of the pitch length (P) with which the arc-shaped grooves 3a of the wave-shaped main groove 3 are repeated. When the distance (L2) of the diagonal groove 5 from the tire equator (CL) in the tire width directions is shorter than 27% of the tread arc width (TW), or when the length (L3) of the diagonal groove 5 in the tire circumferential direction is shorter than 75% of the pitch length (P) of the wave-shaped main groove 3, drainage performance is insufficient.

Meanwhile, when the distance (L2) of the diagonal groove 5 in the tire width directions is longer than 38% of the tread arc width (TW), or when the length (L3) of the diagonal groove 5 in the tire circumferential direction is longer than 95% of the pitch length (P) of the wave-shaped main groove 3, driving stability decreases.

As in the embodiment in FIG. 2 where the auxiliary diagonal groove 6 is inserted between each two diagonal grooves 5 which are adjacent to each other in the tire circumferential direction, the auxiliary diagonal groove 6 is formed so as to have a convex arc shape protruding in a direction opposite to the direction in which the diagonal groove 5 protrudes. In addition, like the groove width of the diagonal groove 5, it is desirable to set the groove width of the auxiliary diagonal groove 6 narrower than those of the straight main groove 2 and each wave-shaped main groove 3, and to set the groove width of the auxiliary diagonal groove 6 at 1 mm to 7 mm.

It is desirable to set an average oblique angle (γ) of each auxiliary diagonal groove 6 to the tire circumferential direction at 65° to 85° in a groove part of the auxiliary diagonal groove 6 which overlaps each two adjacent diagonal groove 5 in the tire width directions in the corresponding region formed between the two adjacent diagonal grooves 5. In addition, it is desirable to set an average oblique angle (δ) of each auxiliary diagonal groove 6 to the tire circumferential direction at 30° to 60° in the remaining groove part of the auxiliary diagonal groove 6 which ranges from the overlapping groove part to the corresponding shoulder end. When each region between the two adjacent diagonal grooves 5 is bisected by the corresponding auxiliary diagonal groove 6 by setting up the average oblique angles (γ) and (δ) as described above, the widths of two parts in each land section obtained by bisecting the region are almost equal to each other. This makes it possible to keep good driving stability.

Here, the average oblique angle (γ) is an oblique angle γ which the below-defined straight line makes with the tire circumferential direction. The straight line is defined as a line joining a groove width center p of the auxiliary diagonal groove 6 situated at the inner end of the auxiliary diagonal groove 6 and a groove width center q of the auxiliary diagonal groove 6 situated at the boundary of the groove part overlapping the diagonal groove 5. In addition, the average oblique angle (δ) is an oblique angle δ which the below-defined straight line makes with the tire circumferential direction. The straight line is defined as a line joining the groove width center q and a groove width center r of the auxiliary diagonal groove 6 which is situated at the shoulder end.

Figure 3:
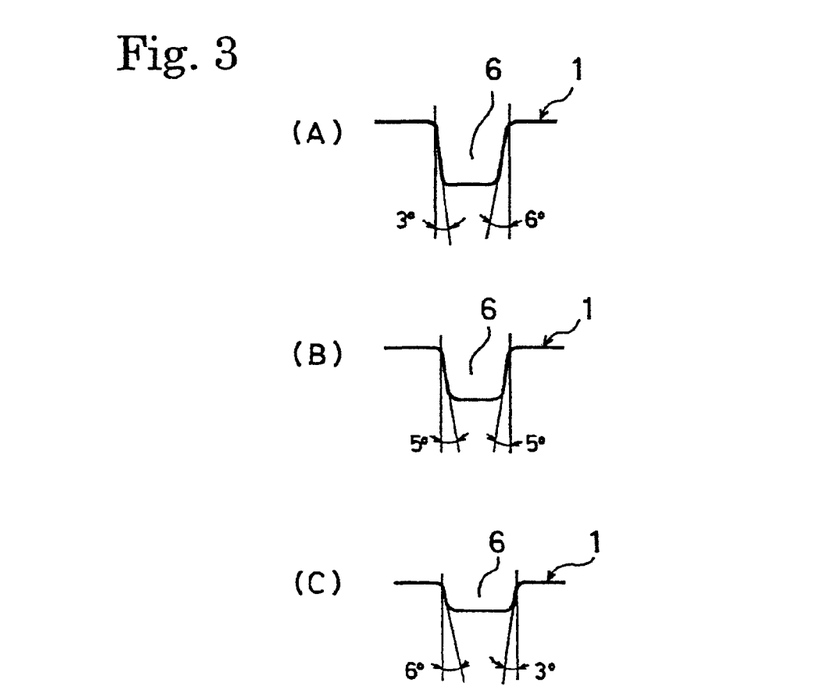
FIG. 3(A) is a cross-sectional view taken along the A-A line of FIG. 2.
FIG. 3(B) is a cross-sectional view taken along the B-B line of FIG. 2.
FIG. 3(C) is a cross-sectional view taken along the C-C line of FIG. 2.

As described above, the groove width of each auxiliary diagonal groove 6 is set gradually narrower toward the inside of the tire from its location corresponding to the extending end portion of the diagonal groove 5. This is effective for improving driving stability. Moreover, as shown in FIG. 3, it is desirable to form each auxiliary diagonal groove 6 in a way that its groove depth is in inverse proportion to its groove width. In other words, it is desirable to form each auxiliary diagonal groove 6 in a way that its groove depth is greater where its groove width is smaller, and that its groove depth is shallower where its groove width is larger. This groove formation makes it possible for the pneumatic tire to carry out its drainage performance more smoothly.

In addition, it is desirable to form both the two groove walls of each auxiliary diagonal groove 6 in a way that the angle of each groove wall to a normal line that is perpendicular to the tread surface is set as shown in FIGS. 3(A) to 3(C). In the inner end portion of the auxiliary diagonal groove 6 in the tire width directions, as shown in FIG. 3(A), an angle which a groove wall located at the outer side of the tire makes with the normal line is set larger than an angle which a groove wall located at the inner side of the tire makes with the normal line. In the intermediary part of the auxiliary diagonal groove 6 in the tire width directions, as shown in FIG. 3(B), an angle which a groove wall located at the outer side of the tire makes with the normal line is set equal to an angle which a groove wall located at the inner side of the tire makes with the normal line. In the outer part of each auxiliary diagonal groove 6 in the tire width directions, as shown in FIG. 3(C), an angle which a groove wall located rearward relative to the tire rotational direction R (or at the leading-edge side) makes with the normal line is set larger than an angle which a groove wall located forward relative to the tire rotational direction R (or at the trailing-edge side) makes with the normal line.

Since the angle which the groove wall at each side of the auxiliary diagonal groove 6 makes with the normal line is set as described above, the auxiliary diagonal groove 6 is applied with a large friction force at its location closer to the inner end in the tire width directions during hard cornering like in circuit racing. However, the foregoing angle setting is capable of preventing such a friction force from unevenly wearing an edge portion of the inner end portion of the auxiliary diagonal groove 6 which is situated toward the outer side of the tire. Moreover, the auxiliary diagonal groove 6 is applied with a large friction force at an edge portion in a direction reverse to the tire rotational direction of its location closer to the shoulder end portion during forward driving. However, the foregoing angle setting is capable of preventing such a friction force from unevenly wearing the auxiliary diagonal groove 6 in the shoulder end portion.

EXAMPLES

In accordance with the following specifications, a tire of the conventional type (Comparative Example) according to Japanese Patent Application Kokai Publication No. 2004-168142 and pneumatic tires (Examples 1 and 2) according to the present invention were fabricated by setting their common tire size to 245/40R18 93W.

With regard to each of these three kinds of tires, the driving stability, uneven wear resistance, drainage performance and noise performance were measured by the following measuring method. The result of the measurement is shown in Table 1.

[Driving Stability]

Four test tires according to each of Comparative Example, Example 1 and Example 2 were mounted on the respective rims (size: 18×8.5JJ) with an air pressure of 230 kPa, and attached to the four wheels of an automobile with an engine of 2.0-liter. Thereafter, for each of Comparative Example, Example 1 and Example 2, five trained test drivers evaluated the driving stability by a sensory test according to a five-point evaluation method while driving on a test course. The driving stability was evaluated for each of the examples with an average of evaluation values representing the respective five drivers' evaluations, and the results of the evaluations of Examples 1 and 2 were shown while indexing the result of the evaluation of Comparative Example as 100. A larger index value means better driving stability.

(Uneven Wear Resistance)

Four test tires according to each of Comparative Example, Example 1 and Example 2 were mounted on the respective rims (size: 18×8.5JJ) with an air pressure of 230 kPa, and attached to the four wheels of an automobile with an engine of 2.0-liter. Subsequently, the automobile ran 2,000 km on a general paved road. Thereafter, the difference in abrasion loss between the leading-edge corner portion and the trailing-edge corner portion which are between a wave-shaped main groove and a corresponding one of the diagonal grooves was measured for each of the examples, and the uneven wear resistance was evaluated by the inverse number of each of the measured values. The results of the evaluations of Examples 1 and 2 were shown while indexing the result of the evaluation of Comparative Example as 100. A larger index value means better uneven wear resistance.

(Drainage Performance)

Four test tires according to each of Comparative Example, Example 1 and Example 2 were mounted on the respective rims (size: 18×8.5JJ) with an air pressure of 230 kPa, and attached to the four wheels of an automobile with an engine of 2.0-liter. Subsequently, for each of the examples, the braking distance with which the automobile ran on a wet road surface at a speed of 100 Km/h was stopped using the ABS control was measured, and the drainage performance was evaluated by the inverse number of each of the measured values. The results of the evaluations of Examples 1 and 2 were shown while indexing the result of the evaluation of Comparative Example as 100. A larger index value means better drainage performance.

(Noise Performance)

Four test tires according to each of Comparative Example, Example 1 and Example 2 were mounted on the respective rims (size: 18×8.5JJ) with an air pressure of 230 kPa, and attached to the four wheels of an automobile with an engine of 2.0-liter. Subsequently, for each of the examples, the level of the sound pressure (dB) which was produced by the corresponding test tire while the automobile ran an interval of 10 m at a speed of 60 km/h was measured by use of a microphone set up in a position 7.5 m away from the automobile and 1.2 m above the road surface in accordance with a test method under JASO (Japan Automobile Standards Organization) Standard C-606.

Comparative Example

| Tread Pattern | FIG. 4 |
|---|---|
| Groove Width of Straight Main Groove 42 | 12.7 mm |
| Groove Width of Wave-shaped Main Groove 43 | 9.5 mm |
| Pitch Length P of Wave-shaped Main Groove 43 (Arc-shaped Grooves) | 57 mm to 83 mm |
| Number of Pitches of Wave-shaped Main Groove 43 (Arc-shaped Grooves) | 24 |
| Groove Width of Diagonal Groove 45a | 4.6 mm |
| Groove Width of Diagonal Groove 45b | 4.6 mm |
| Average Oblique Angle of Diagonal Grooves 45a and 45b | 57° |
| Groove Width of Narrow groove 46 Extending in Circumferential Direction | 3.2 mm |

Example 1

| Tread Pattern | FIG. 1 |
|---|---|
| Groove Width of Straight Main Groove 2 | 12.7 mm |
| Groove Width of Wave-shaped Main Groove 3 | 9.5 mm |
| Pitch Length P of Wave-shaped Main Groove 3 (Arc-shaped Grooves) | 57 mm to 83 mm |
| Number of Pitches of Wave-shaped Main Groove 3 (Arc-shaped Grooves) | 24 |
| Groove Width of Diagonal Groove 5 | 5.0 mm |
| Average Oblique Angle α of Diagonal Groove 5 | 55° |
| Average Oblique Angle β of Diagonal Groove 5 | 27° |

Example 2

| Tread Pattern | FIG. 2 |
|---|---|
| Groove Width of Straight Main Groove 2 | 12.7 mm |
| Groove Width of Wave-shaped Main Groove 3 | 9.5 mm |
| Pitch Length P of Wave-shaped Main Groove 3 (Arc-shaped Grooves) | 57 mm to 83 mm |
| Number of Pitches of Wave-shaped Main Groove 3 (Arc-shaped Grooves) | 24 |
| Groove Width of Diagonal Groove 5 | 5.0 mm |
| Average Oblique Angle α of Diagonal Groove 5 | 55° |
| Average Oblique Angle β of Diagonal Groove 5 | 27° |
| Groove Width of Auxiliary Diagonal Groove 6 | Inner Side in Tire Width Directions 2.5 mm Outer Side in Tire Width Directions 4.0 mm |
| Average Oblique Angle γ of Auxiliary Diagonal Groove 6 | 41° |
| Average Oblique Angle δ of Auxiliary Diagonal Groove 6 | 72° |
| Groove Width of Auxiliary Diagonal Groove 7 | 4.0 mm |

TABLE 1

| | Comparative Example | Example 1 | Example 2 |
|---|---|---|---|
| Tread Pattern | FIG. 4 | FIG. 1 | FIG. 2 |
| Driving Stability (Index) | 100 | 105 | 103 |
| Uneven Wear Resistance (Index) | 100 | 103 | 103 |
| Noise Performance (dB) | 69.7 | 69.2 | 69.4 |
| Drainage Performance (Index) | 100 | 97 | 100 |

What is claimed is:

1. A pneumatic tire for which a tire rotational direction is specified, comprising:
a straight main groove arranged in a center area of a tread in a tire circumferential direction;

a wave-shaped main groove arranged in the tire circumferential direction at each of two sides of the straight main groove with a rib-shaped land section interposed between the straight main groove and the wave-shaped main groove, the wave-shaped main groove being formed by connecting a plurality of arc-shaped grooves in series in the tire circumferential direction, and each arc-shaped groove curving to have a convex shape protruding toward the inner side of the tire; and a plurality of diagonal grooves arranged in each shoulder area ranging from its corresponding one of the wave-shaped main grooves toward the outer side of the tire, each diagonal groove extending obliquely outward from a connecting part between corresponding two arc-shaped grooves to a direction reverse to the tire rotational direction, wherein each diagonal groove is formed to have a convex arc shape protruding toward the outer side of the tire, an extending end portion of each diagonal groove terminates in the shoulder area, each shoulder area is provided with a non-block pattern in which the land section continues in the tire circumferential direction, and in each shoulder area, arc-shaped auxiliary diagonal grooves are arranged, a starting end of each auxiliary diagonal groove being located in an area between the corresponding two of the diagonal grooves adjacent to each other in the tire circumferential direction, the auxiliary diagonal groove extending obliquely outward to an end portion of the shoulder area in the direction reverse to the tire rotational direction, and each auxiliary diagonal groove curving to have a convex arc shape protruding in a direction opposite to the direction in which the corresponding diagonal grooves protrude, thereby, the shoulder area is provided with a non-block pattern in which the land section continues in a zigzag fashion in the tire width and circumferential directions.

2. The pneumatic tire according to claim 1, wherein each wave-shaped main groove is formed to be a see-through groove by which when the wave-shaped main groove is viewed in the tire circumferential direction, a farther side can be viewed while the view is not obstructed by the right and left groove walls of the wave-shaped main groove, and a distance (L1) with which each outermost edge of the wave-shaped main groove is away from a tire equator (CL) in tire width directions is set at 10% to 20% of a tread arc width (TW).

3. The pneumatic tire according to any one of claims 1 and 2, wherein an amplitude (W) of each wave-shaped main groove is set at 1% to 5% of the tread arc width (TW), and a pitch length (P) with which the arc-shaped grooves are repeated is set at 50 mm to 90 mm.

4. The pneumatic tire according to any one of claims 1 and 2, wherein a groove width of each diagonal groove is smaller than a groove width of the straight main groove and a groove width of each wave-shaped main groove.

5. The pneumatic tire according to any one of claims 1 and 2, wherein an average oblique angle ($\alpha$) of each diagonal groove to the tire circumferential direction is set at 40° to 70° in its groove part ranging from its corresponding one of the wave-shaped main grooves to a location corresponding to a half of the length of the diagonal groove in the tire width directions, and an average oblique angle ($\beta$) of each diagonal groove to the tire circumferential direction is set at 10° to 40° in its remaining groove part ranging from the location corresponding to the half of the length to an outermost end of the diagonal groove.

6. The pneumatic tire according to any one of claims 1 and 2, wherein a distance (L2) with which an outermost end of each diagonal groove is away from the tire equator (CL) in the tire width direction is set at 27% to 38% of the tread arc width (TW), and a length (L3) of each diagonal groove in the tire circumferential direction is set at 75% to 95% of the pitch length (P) with which the arc-shaped grooves are repeated.

7. The pneumatic tire according to claim 1, wherein a groove width of a groove part of each auxiliary diagonal groove which extends toward the inner side of the tire from a position corresponding to a location of the extending end portion of the corresponding diagonal groove is set to be gradually smaller toward the inner side of the tire.

8. The pneumatic tire according to claim 1, wherein in an innermost part of each auxiliary diagonal groove in the tire width direction, an angle which a groove wall located at the outer side of the tire makes with a normal line that is perpendicular to a tread surface is set larger than an angle which a groove wall located at the inner side of the tire makes with the normal line, in an intermediary part of the auxiliary diagonal groove in the tire width directions, an angle which a groove wall located at the outer side of the tire makes with the normal line is set equal to an angle which a groove wall located at the inner side of the tire makes with the normal line, and in an outermost part of each auxiliary diagonal groove in the tire width direction, an angle which a groove wall located rearward in the tire rotational direction makes with the normal line is set larger than an angle which a groove wall located forward in the tire rotational direction makes with the normal line.

9. The pneumatic tire according to claim 1, wherein a groove width of the straight main groove and a groove width of each wave-shaped main groove are each set to 5 mm to 15 mm, and a groove width of each diagonal groove and a groove width of each auxiliary diagonal groove are set to be smaller than the groove width of the straight main groove and the groove width of the wave-shaped main groove, and are each set to 1 mm to 7 mm.

* * * * *